J. S. FRIEDE.
CLOCK SUPPORT.
APPLICATION FILED FEB. 26, 1916.
1,200,443.
Patented Oct. 3, 1916.
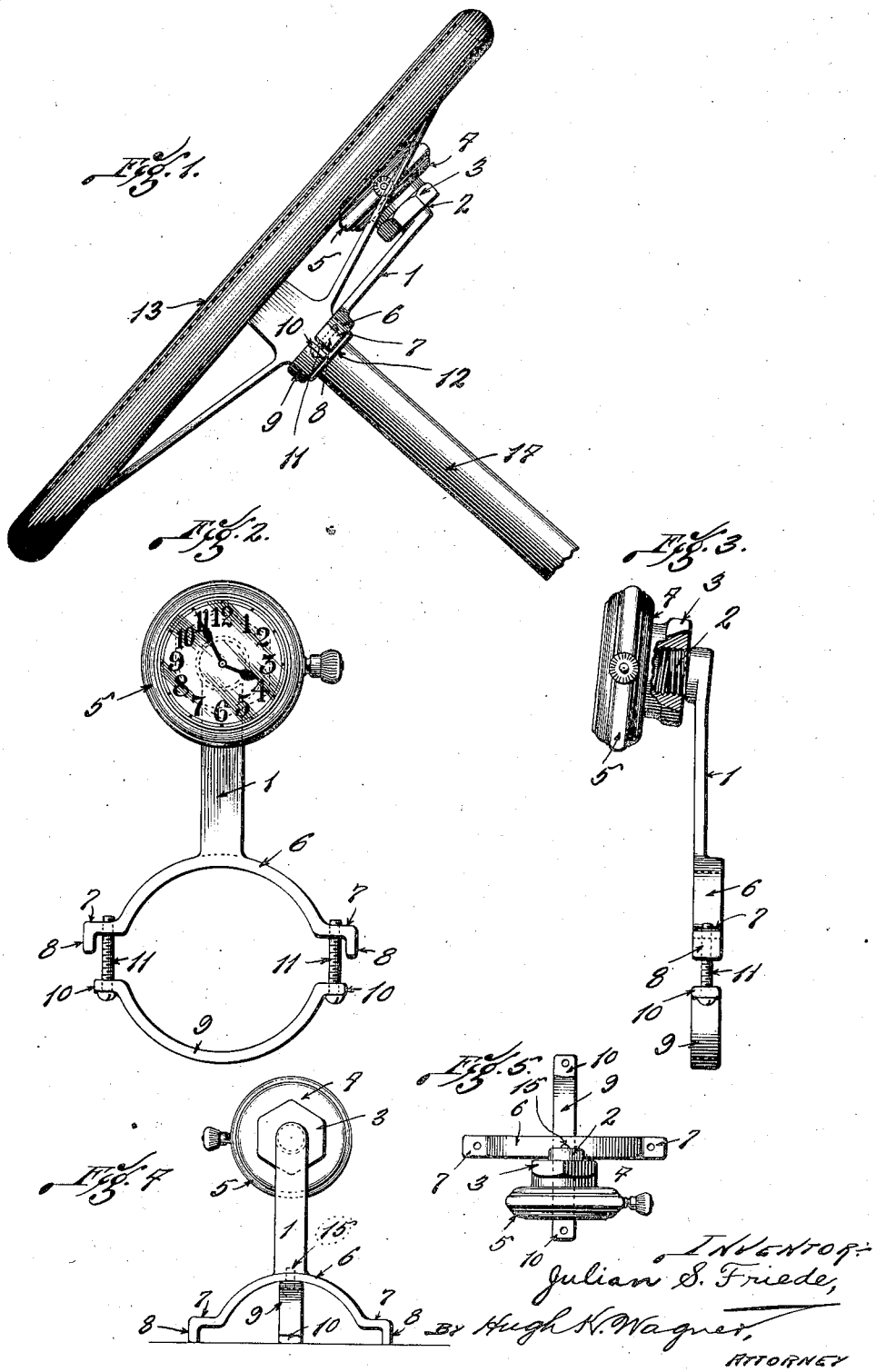

UNITED STATES PATENT OFFICE.

JULIAN S. FRIEDE, OF ST. LOUIS, MISSOURI.

CLOCK-SUPPORT.

1,200,443. Specification of Letters Patent. Patented Oct. 3, 1916.

Application filed February 26, 1916. Serial No. 80,634.

*To all whom it may concern:*

Be it known that I, JULIAN S. FRIEDE, a citizen of the United States, residing at the city of St. Louis, in the State of Missouri, have invented certain new and useful Improvements in Clock-Supports, of which the following is a specification.

This invention relates to clock-supports and has for its object to provide a device of the character described, of simple, cheap, and strong construction adapted for removably supporting a time-piece in adjusted positions in association with a part of a motor-driven vehicle or the like and adapted, also, as a stand for supporting a time-piece upon a desk, table or the like.

Another object is to provide a clock-support having adjustable means adapted, in one adjusted position thereof, as a clamp for removably attaching the device of this invention to a part of a motor-driven vehicle or the like in a position so that the time-piece borne by the device may be conveniently within the view of the driver of said vehicle and adapted, in another adjusted position of parts, as a base or pedestal for supporting the device, with the time piece borne thereby, upon a desk, table or the like.

An advantage of the present invention is that the device consists of few parts, is readily adjustable for clamping upon a suitable part of a motor-driven vehicle or the like or for use as a time-piece stand to rest upon a desk, table or the like. Moreover, the clamping means is adapted to be adjusted to various sizes of vehicle-parts to which it may be attached.

In the accompanying drawings, forming part of this specification, wherein like numbers of reference denote like parts wherever they occur, Figure 1 is a side view of the steering wheel and a fragment of the steering post of a motor-driven vehicle or the like with the device of this invention in association therewith and shows a suitable position in which said device may be borne attached to a portion of said wheel; Fig. 2 is a front view, in plan elevation, showing the device of this invention, on an enlarged scale, removed from association with the steering wheel and post of Fig. 1, the adjustable means of the device being shown in the position adapted as a clamp: Fig. 3 is a side view, in plan elevation, of Fig. 2: Fig. 4 is a rear view, in plan elevation, of the device of this invention showing the adjustable means thereof in the position adapted to constitute the device a stand for supporting the time-piece associated therewith upon a desk, table or the like; and Fig. 5 is a plan view looking down upon Fig. 4.

One end of standard 1 may bear forwardly directed extension 2 extending away from said standard at substantially an obtuse angle thereto, said extension being screw-threaded, as best seen in Fig. 3, and adapted to enter the internally screwthreaded opening of nut 3 or the like and to engage said internal screw-threads for removably attaching said nut and said extension together. Said nut may be secured to the back-cover 4 of time-piece 5 in any suitable manner, said back-cover being adapted to be removably associated with the case of said time-piece in a well-known manner, such, for instance, as by means of a peripheral flange, not specifically shown, borne by the edge of said back-cover and adapted to be forced upon and removably engage a bead or the like, not specifically shown, borne by an adjacent portion of the case of said time-piece. Time-piece 5 may be of any suitable construction and may be an ordinary watch, but for use in association with a motor-driven vehicle the time-piece may consist of a clock-movement inclosed in a watch-case to provide a compact suitable time-piece adapted to withstand the jarring and the like to which it is subjected through the motion of said vehicle. The other end of standard 1 may bear an arched member 6, said member having its opposite ends extending laterally away from said other end of said standard, said opposite ends each bearing a laterally extending flange 7, a downwardly depending flange 8 being borne by the outer end of each of said flanges 7.

A separable arched member 9 may be provided, said separable arched member bearing a laterally extending flange 10 at each of its two opposite ends. Arched member 6 and separable arched member 9 together with screws 11 or the like are adapted to form an adjustable clamp for clamping the device of this invention in adjusted positions upon a convenient part of a motor-driven vehicle, such, for instance, as upon the flange or collar 12 of the hub of steering wheel 13, said screws 11 or the like being of any suitable length and each adapted to extend through appropriate openings therefor in opposite flanges 7 and 10, which openings may be screw-threaded, said screws or the like providing convenient means for adjusting the size of the clamp to the size of the part clamped and for adjustably tightening the clamp for holding arched member 6 and separable arched member 9 together in clamping position on said part.

It is, of course understood, that the position of the device of this invention with reference to steering wheel 12 and the adjusting of the clamping means upon flange or collar 12, as shown in Fig. 1, is merely by way of illustration and that the device may be clamped upon steering post 14 or any other suitable and convenient part of a motor-driven vehicle. Moreover, it is, also, of course, understood that the clamping means consisting of arched member 6, separable arched member 9, and screws 11 or the like are adapted to clamp the support of this invention upon a bed-post (not shown) or upon a suitable part of any other piece of furniture or the like in an adjusted position suitable for permitting the time-piece to be viewed for any desired purpose.

In the position of parts shown in Figs. 4 and 5, arched member 6 and separable arched member 9 are adapted to provide a base or pedestal for standing the device of this invention upon a desk, table, or the like, separable arched member 9 being removably attached to arched member 6 at substantially a right-angle thereto by means of screw 15 or the like, with the top of separable arched member 9 adjacent the lower wall of the top of arched member 6 and below the end of standard 1 bearing said arched member 6, depending flanges 8 of arched member 6 and lateral flanges 10 of separable arched member 9 being adapted as the feet of said pedestal and the arched portions of said arched members being adapted as the legs borne by said feet, standard 1 extending upwardly of said base with extension 2 engaging nut 3 bearing time-piece 5 in a position convenient for permitting said time-piece to be viewed, said base or pedestal providing a firm stand for the device.

An advantage in providing a construction of parts wherein extension 2 extends away from standard 1 at substantially an obtuse angle, as best seen in Fig. 3, is that time-piece 5 borne by nut 3 mounted on said extension is tilted slightly away from the vertical or horizontal to throw the face of the time-piece on a plane at an angle to the plane of standard 1 to facilitate giving the observer a view of said face whether the device is used in association with a motor-driven vehicle or as a support resting on a desk or the like.

If desired, nut 3 may be omitted in construction and extension 2 may be directly secured in any suitable manner to an appropriate part of the case of time-piece 5.

In the construction of parts described herein and shown in the drawings screws 11 may be adapted to engage appropriate screw-threaded openings therefor in arched member 6, the openings in separable arched member 9 borne by flanges 10 being preferably smooth-bored.

Many changes in the details of construction and in the arrangement and combination of parts may be made without departing from the nature and spirit of the present invention.

I claim:

1. A time-piece support comprising a standard, means for removably supporting a time-piece adjacent one end of said standard, and adjustable means adjacent the other end of said standard and including a separable member, said adjustable means being adapted interchangeably as a clamp and as a pedestal for said support.

2. A device of the character described adapted as a time-piece support, said support comprising a standard, means for removably supporting a time-piece adjacent one end of said standard, and adjustable means borne adjacent the other end of said standard and including a removable member, said adjustable means being adapted interchangeably as an adjustable clamp for constituting the device as a bracket and as a base to constitute said device as a stand adapted to rest upon a table or the like.

3. The combination with a time-piece of a support therefor, said support comprising a standard, screw-threaded means borne by said standard, screw-threaded means borne by said time-piece, said two screw-threaded means being adapted to coöperate for removably mounting said time-piece on said standard, and adjustable means borne by said standard and including a separable member, said adjustable means being adapted interchangeably as a clamp and as a pedestal base for said support.

4. The combination with a time-piece of a support therefor, said support comprising a standard having a screw-threaded portion, screw-threaded means borne by the removable back-cover of said time-piece, said screw-threaded portion being adapted to engage said screw-threaded means for removably mounting said time-piece on said standard, and adjustable means borne by said standard and including a separable member, said adjustable means being adapted interchangeably as a clamp and as a pedestal base for said support.

5. The combination with a time-piece of a support therefor, said support comprising a standard, a screw-threaded extension borne by said standard, a screw-threaded nut borne by said time-piece, said screwthreaded extension being adapted to engage said screw-threaded nut for removably mounting said time-piece on said standard, and adjustable means adapted interchangeably as an adjustable clamp and as a pedestal base for said support, said adjustable means including a member rigidly borne by said standard and a separable member adapted to be removably borne by said rigidly borne member.

6. The combination with a time-piece of a support therefor, said support comprising a standard, means for mounting said time-piece adjacent one end of said standard, a member borne adjacent the other end of said standard, and means removably borne by said first-named member, said member and said removable means, in one relative position of parts, being adapted to form an adjustable clamp for said support and being adapted, in another relative position of parts, to form a pedestal base for said support.

7. The combination with a time-piece of a support therefor, said support comprising a standard, means for mounting said time-piece adjacent one end of said standard, an arched member rigidly borne adjacent the other end of said standard, said arched member bearing flanged end-portions, an arched member adapted to be removably borne by said first-named arched member and bearing flanged end-portions, adjustable means for removably connecting said flanged portions of said rigidly borne and said removable arched member together to form an adjustable clamp for said support, and means for removably attaching said removable arched member to said rigidly borne arched member to form a pedestal base for resting said support upon a table or the like with said flanged end-portions adjacent the top of said table or the like.

8. In combination with a steering wheel of an automobile having ribs and a hand-rim, a time-piece supporting member removably mounted with reference to the said ribs so that a time-piece supported thereon is visible through the wheel between the said ribs, said supporting member comprising a standard mounted on the hub of the wheel and below the ribs thereof, means for removably supporting a time-piece at one end of said standard, and adjustable means adjacent to the other end of said standard including a separable member adapted as a clamp for securing the supporting member in position.

9. A convertible bracket and stand support for a time-piece, said support comprising a standard, means for mounting said time-piece adjacent one end of said standard, means adjacent the other end of said standard and adapted interchangeably as a clamp to constitute said support a bracket and as a pedestal base to constitute said support as a movable stand, said interchangeable means including a member rigidly borne by said standard and a separable member adapted to be removably and adjustably borne by said rigidly borne member.

10. A convertible bracket and stand support for a time-piece, said support comprising a standard, an extension borne adjacent one end of said standard and extending away from said standard at an obtuse angle, means for mounting the time-piece on said extension, means adjacent the other end of said standard and adapted interchangeably as an adjustable clamp to constitute said support a bracket and adapted, also as a pedestal base to constitute said support a movable stand adapted to rest on a table or the like, said interchangeable means including a member rigidly borne by said standard and a separable member adapted to be removably borne by said rigidly borne member.

11. A convertible bracket and stand support for a time-piece, said support comprising a standard, an extension borne by said standard adjacent one end thereof and extending away from said standard at an obtuse angle, means for mounting the time-piece on said extension, a member rigidly borne adjacent the other end of said standard, and a member adapted to be removably borne by said rigidly borne member, said removable member being adapted to form with said rigidly borne member an adjustable clamp in one adjusted position to constitute said support a bracket and being adapted, also, in another position of parts to form with said rigidly borne member a pedestal-base to constitute said support a movable stand adapted to rest upon a table or the like.

In testimony whereof I hereunto affix my signature.

JULIAN S. FRIEDE.